United States Patent
He

(10) Patent No.: US 12,399,590 B2
(45) Date of Patent: Aug. 26, 2025

(54) CASCADE TOUCH CONTROL SYSTEM

(71) Applicant: Himax Technologies Limited, Tainan (TW)

(72) Inventor: Jia-Ming He, Tainan (TW)

(73) Assignee: Himax Technologies Limited, Tainan (TW)

( * ) Notice: Subject to any disclaimer, the term of this patent is extended or adjusted under 35 U.S.C. 154(b) by 0 days.

(21) Appl. No.: 18/398,168

(22) Filed: Dec. 28, 2023

(65) Prior Publication Data

US 2025/0216974 A1    Jul. 3, 2025

(51) Int. Cl.
*G06F 3/044* (2006.01)
*G06F 1/03* (2006.01)
*G06F 3/041* (2006.01)
*G06F 3/05* (2006.01)
*G06F 3/03* (2006.01)

(52) U.S. Cl.
CPC ........ *G06F 3/04166* (2019.05); *G06F 1/0335* (2013.01); *G06F 3/0446* (2019.05); *G06F 3/05* (2013.01); *G06F 3/03* (2013.01)

(58) Field of Classification Search
CPC .. G06F 3/04166; G06F 1/0335; G06F 3/0446; G06F 3/05; G06F 3/03; G06F 3/00; G06F 3/01; G06F 3/048; G06F 3/0487; G06F 3/0481; G06F 1/0328; G06F 1/0321; G06F 1/03; G06F 1/02; G06F 1/00; G06F 3/0416; G06F 3/041
See application file for complete search history.

(56) References Cited

U.S. PATENT DOCUMENTS

| | | | |
|---|---|---|---|
| 2008/0158167 A1* | 7/2008 | Hotelling | G06F 1/3265 345/173 |
| 2009/0273579 A1* | 11/2009 | Zachut | G06F 3/0446 345/174 |
| 2011/0084857 A1* | 4/2011 | Marino | G06F 3/0446 341/5 |
| 2012/0050216 A1* | 3/2012 | Kremin | G06F 3/0446 345/174 |
| 2012/0056841 A1* | 3/2012 | Krenik | G06F 3/04182 345/174 |
| 2015/0261375 A1* | 9/2015 | Leigh | G06F 3/04186 345/174 |
| 2016/0370912 A1* | 12/2016 | Qiao | G06F 3/04166 |
| 2017/0344174 A1* | 11/2017 | Pant | G06F 3/0441 |

FOREIGN PATENT DOCUMENTS

GB        2630380 A  *  11/2024  ...........  G06F 3/0446

* cited by examiner

*Primary Examiner* — Julie Anne Watko
(74) *Attorney, Agent, or Firm* — Donald E. Stout; Stout, Uxa & Buyan, LLP

(57) ABSTRACT

A cascade touch control system includes a touch panel composed of a plurality of transmit lines and a plurality of receive lines; and a plurality of drivers controlling corresponding blocks of the touch panel, each block being divided into matrices each including same number of transmit lines and receive lines. Multi-tone touch control is performed on matrices of the blocks. For each matrix of each block, transmit signals are transmitted in each time interval associated with a corresponding receive line, of which one transmit signal has a phase opposite to other transmit signals, and different transmit signals with the opposite phase correspond to different time intervals.

12 Claims, 8 Drawing Sheets

CASCADE TOUCH CONTROL SYSTEM

BACKGROUND OF THE INVENTION

1. Field of the Invention

The present invention generally relates to a touch control system, and more particularly to a cascade touch control system.

2. Description of Related Art

A touch panel is a sensor device that is used to detect touch inputs on a display screen. Touch panels are used in a wide range of devices, such as smartphones, tablets, laptops, and other electronic devices.

Electromagnetic interference (EMI) can negatively impact the performance of touch panels. EMI can be caused by a variety of sources, such as radio frequency (RF) signals, power lines, and other electronic devices.

Capacitive touch panels work by detecting changes in capacitance. They consist of a layer of glass or plastic coated with a transparent conductor such as indium tin oxide (ITO). When a finger touches the screen, it changes the electrical field on the surface of the screen, and this change is detected by sensors located at the corners of the screen. Capacitive touch panels, which are commonly used in smartphones and other portable devices, are particularly susceptible to EMI.

The rapid growth of electric vehicles has increased the demand for electronic products in the automotive field. These products include navigation, audio and video equipment, as well as various chips that control the car's functions, such as autonomous driving, driving assistance systems, etc. To ensure the smooth operation of these products, the circuit design must reduce EMI, which is the interference between different electronic parts in the car. EMI can affect the performance and safety of the car, so it is very important to avoid it in automotive applications.

For car touchscreens, safety requires a thick glass cover on the panel. This makes the touch effect worse. To improve the touch effect, some methods however increase EMI. EMI is more serious for larger panels.

As devices like mobile phones or tablets become slimmer, the gap between the touch panel and the display panel shrinks. This increases the parasitic capacitance between them. The display panel generates a lot of noise interference when it switches. The noise charge may be much higher than the signal received, which can interfere with the detection of touch signals.

One of the challenges in designing touch sensors for automotive applications is to achieve high touch h performance while minimizing electromagnetic interference (EMI). Therefore, there is a demand for a new approach that can enhance the touch sensitivity and reduce the EMI level for automotive applications.

SUMMARY OF THE INVENTION

In view of the foregoing, it is an object of the embodiment of the present invention to provide a cascade touch control system capable of effectively reducing electromagnetic interference (EMI) without sacrificing touch performance.

According to one embodiment, a cascade touch control system includes a touch panel and a plurality of drivers. The touch panel is composed of a plurality of transmit lines and a plurality of receive lines. The drivers control corresponding blocks of the touch panel, each block being divided into matrices each including same number of transmit lines and receive lines. Multi-tone touch control is performed on matrices of the blocks.

DETAILED DESCRIPTION OF THE INVENTION

Figure 1:
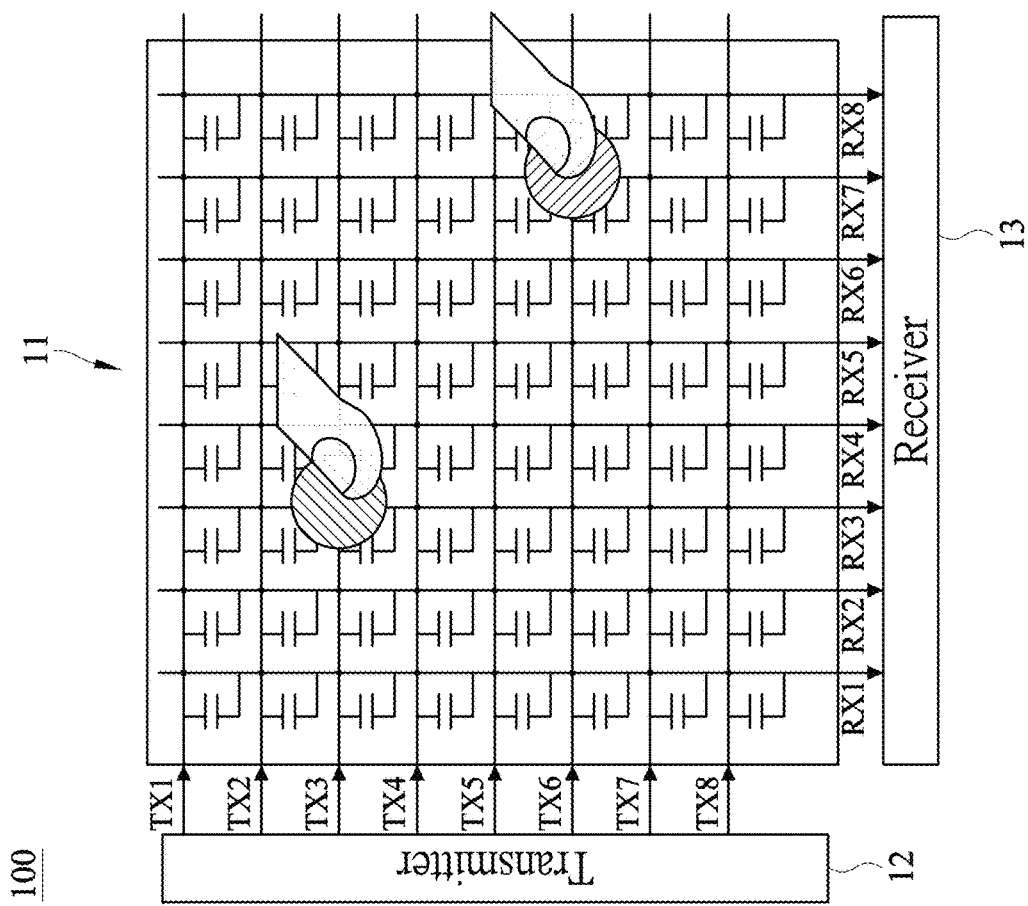
FIG. 1 shows a simplified block diagram exemplifying a touch control system.

FIG. 1 shows a simplified block diagram exemplifying a touch control system 100. Specifically, the touch control system 100 may include a touch panel 11 composed of a plurality of transmit lines, for example, TX1-TX8 disposed on a first layer and a plurality of receive lines, for example, RX1-RX8 disposed on a second layer. There are capacitors respectively located at intersections of the transmit lines TX1-TX8 and the receive lines RX1-RX8 for detecting a touch position (i.e., single-touch) or multiple touch positions (i.e., multi-touch).

The touch control system 100 may include a transmitter 12 configured to transmit at least one transmit signal (at a time) to corresponding transmit line TX1-TX8. The touch control system 100 may include a receiver 13 configured to receive at least one receive signal (at a time) from corresponding receive line RX1-RX8.

Figure 2A:
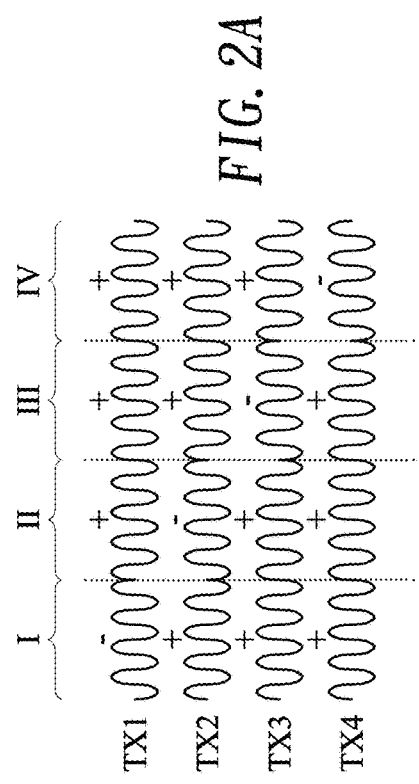
FIG. 2A shows exemplary timing diagrams of transmit signals of the touch control system adopting multi-tone touch control.

FIG. 2A shows exemplary timing diagrams of transmit signals of the touch control system 100 adopting multi-tone touch control performing on a matrix with N transmit lines and N receive lines, that is, N×N matrix, N is a positive integer greater than one (4×4 matrix is exemplified here).

Specifically, in the first time interval I, transmit signals [−1 +1 +1 +1] are transmitted (at the same time) via transmit lines TX1-TX4 associated with a receive signal w via receive line RX1; in the second time interval II, transmit signals [+1 −1 +1 +1] are transmitted via transmit lines TX1-TX4 associated with a receive signal x via receive line RX2; in the third time interval III, transmit signals [+1 +1 −1

+1] are transmitted via transmit lines TX1-TX4 associated with a receive signal y via receive line RX3; and in the fourth time interval IV, transmit signals [+1 +1 +1 −1] are transmitted via transmit lines TX1-TX4 associated with a receive signal z via receive line RX4. Generally speaking, for each matrix (with same number of transmit lines and receive lines) of the touch panel 11, transmit signals are transmitted in each time interval associated with a corresponding receive line, of which one transmit signal has a phase opposite to other transmit signals, and different transmit signals with the opposite phase correspond to different time intervals.

Figure 2B:
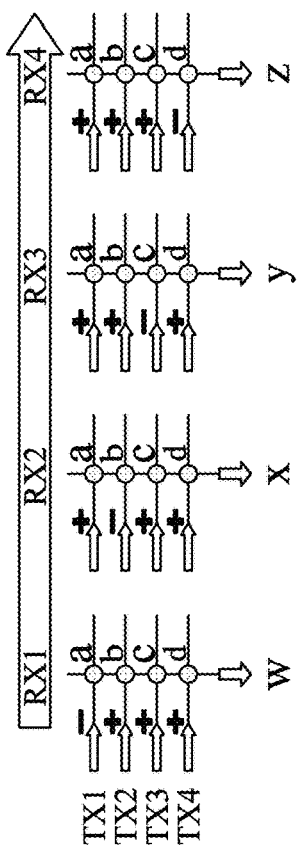
FIG. 2B schematically shows transmit signals and corresponding time intervals with associated receive lines.
Figure 2C:
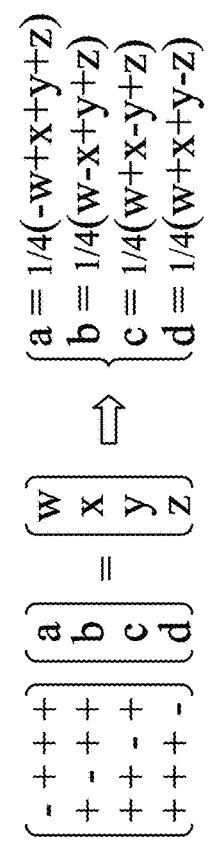
FIG. 2C shows mathematical expression of the transmit signals and the receive signals.

FIG. 2B schematically shows transmit signals and corresponding time intervals with associated receive lines RX1-RX4, where a, b, c and d represent capacitances (for detecting touching) at intersections of the transmit lines TX1-TX4 and a receive line. FIG. 2C shows mathematical expression of the transmit signals and the receive signals w, x, y, z. Because the transmit signals are encoded, when a certain receive signal is contaminated by noise, the noise will be averaged before obtaining the capacitances a, b, c and d for detecting touching.

Figure 3A:
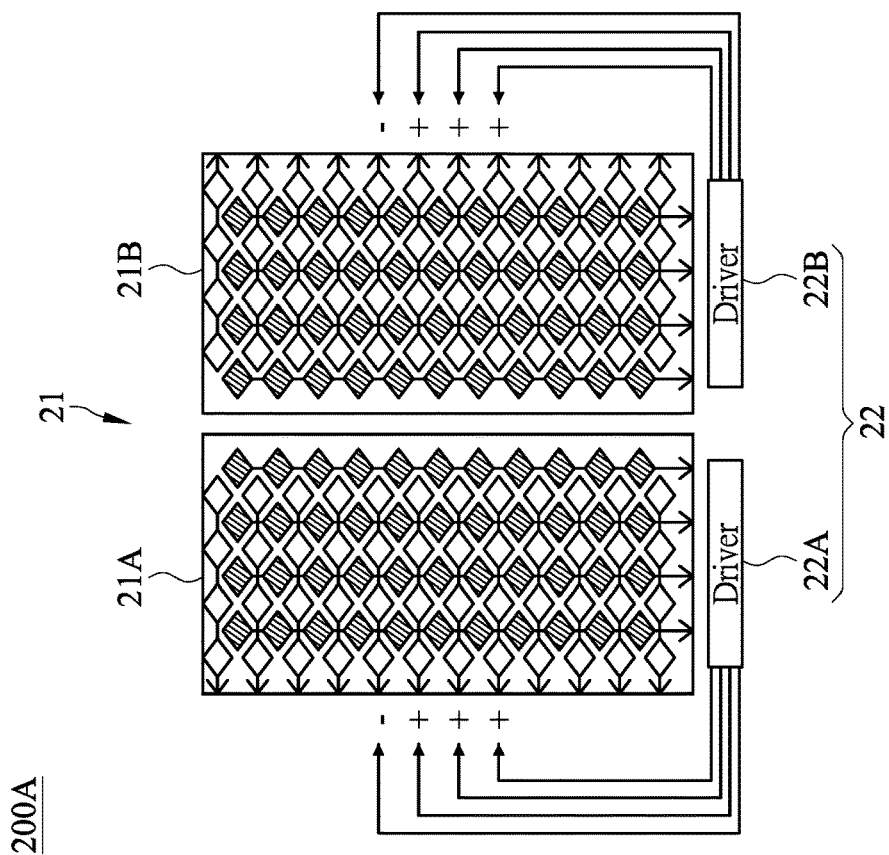
FIG. 3A and FIG. 3B show simplified schematic diagrams illustrating a cascade touch control system.
Figure 3B:
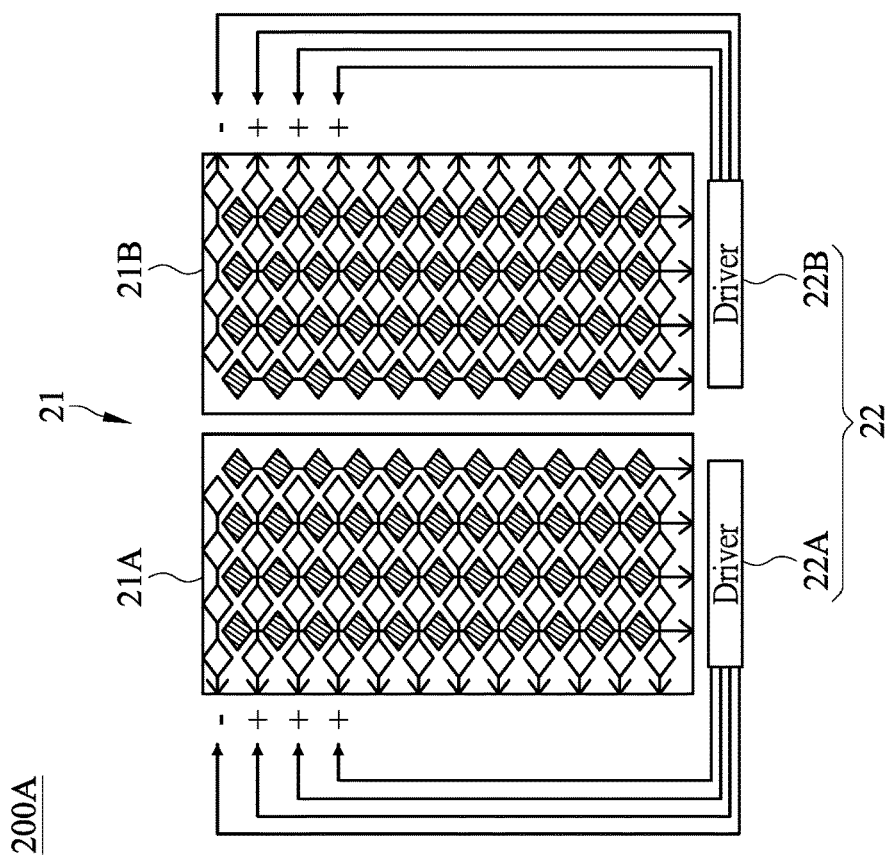

FIG. 3A and FIG. 3B show simplified schematic diagrams illustrating a cascade touch control system 200A. The touch panel 21 is divided into multiple (i.e., at least two) blocks (e.g., a first block 21A and a second block 21B) that are controlled by corresponding drivers 22 (e.g., a first driver 22A and a second driver 22B). Further, the blocks are respectively divided into matrices each including same number of transmit lines and receive lines, for example, N transmit lines and N receive lines, that is, N×N matrix, N is a positive integer greater than one (4×4 matrix is exemplified here).

Multi-tone touch control of the cascade touch control system 200A is similar to the touch control system 100 (of FIG. 1 through FIG. 2C) except that same multi-tone touch control is performed on corresponding same matrices (of transmit lines and receive lines) of the multiple blocks of the touch panel 21 at the same time by associated drivers 22. As exemplified in FIG. 3A, multi-tone touch control is performed on a first 4×4 matrix (generally m-th matrix, m is a positive integer) of the first block 21A and a first 4×4 matrix (generally m-th matrix) of the second block 21B at the same time for four time intervals. Next, as exemplified in FIG. 3B, multi-tone touch control is performed on a second 4×4 matrix of the first block 21A and a second 4×4 matrix of the second block 21B at the same time for four time intervals.

Figure 4A:
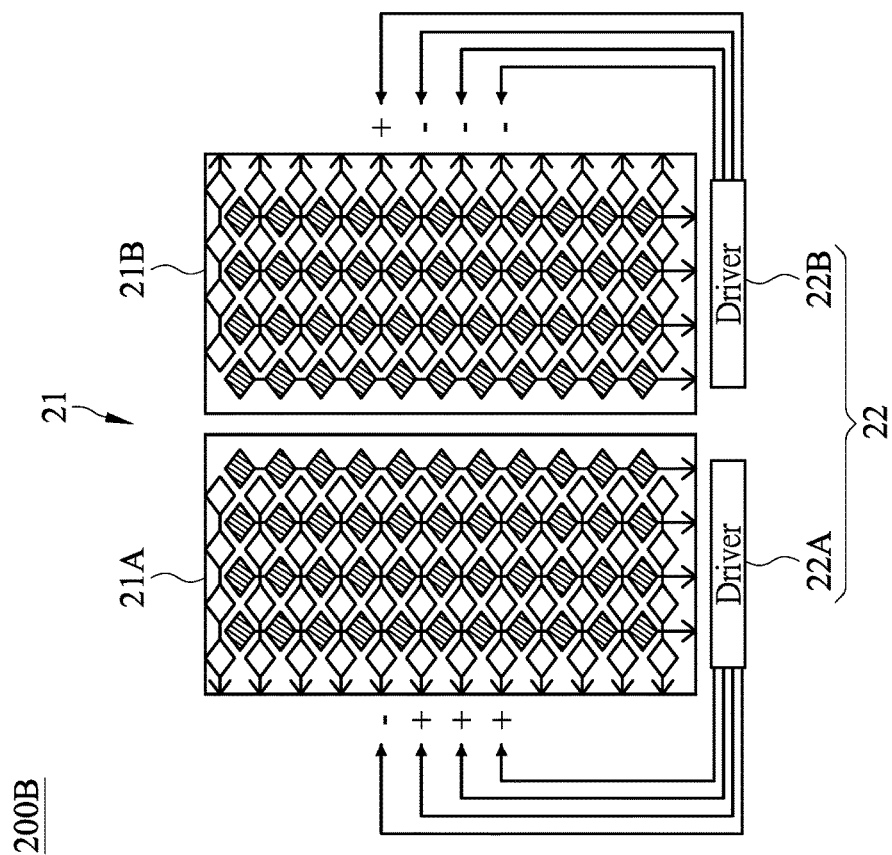
FIG. 4A and FIG. 4B show simplified schematic diagrams illustrating a cascade touch control system according to one embodiment of the present invention.
Figure 4B:
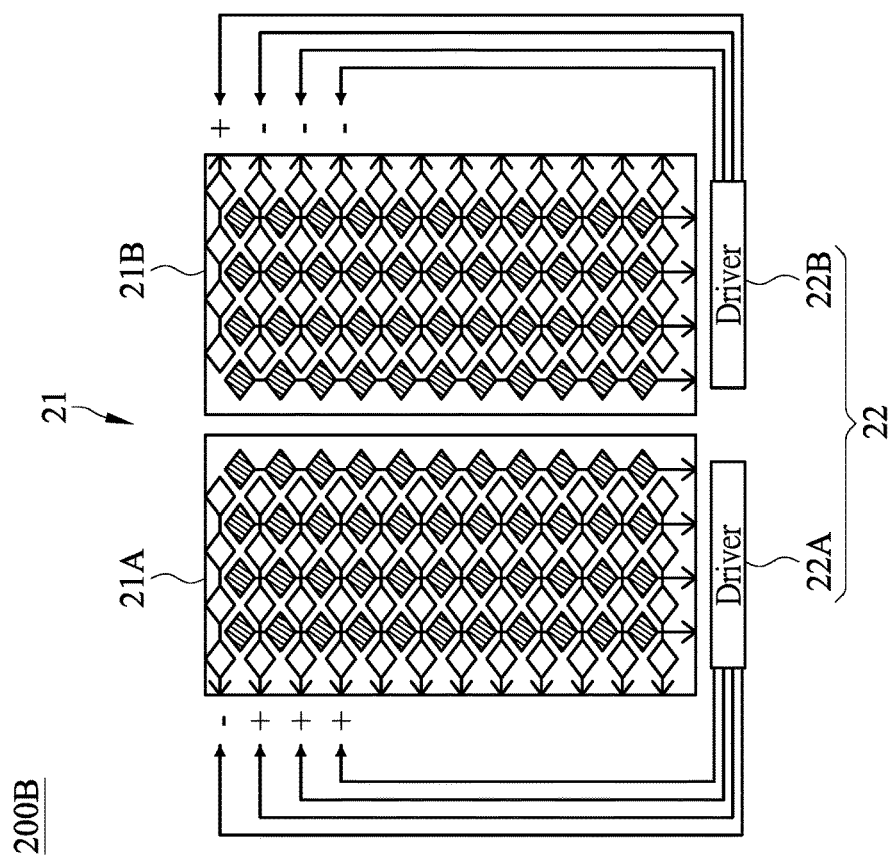

FIG. 4A and FIG. 4B show simplified schematic diagrams illustrating a cascade touch control system 200B according to one embodiment of the present invention. Multi-tone touch control of the cascade touch control system 200B of FIG. 4A/4B is similar to the cascade touch control system 200A of FIG. 3A/3B except that, in the present embodiment, different (or opposite) multi-tone touch controls are performed on corresponding same matrices (of transmit lines and receive lines) of the multiple blocks of the touch panel 21 at the same time by associated drivers 22. Specifically, any transmit signal in one block at any given time has a phase opposite to a corresponding transmit signal in another block.

As exemplified in FIG. 4A, transmit signals [−1 +1 +1 +1] of a first matrix of the first block 21A are transmitted associated with a receive line and (opposite) transmit signals [+1 −1 −1 −1] of a corresponding first matrix of the second block 21B are transmitted associated with a corresponding receive line at the same time interval. Next, as exemplified in FIG. 4B, transmit signals [−1 +1 +1 +1] of a second matrix of the first block 21A are transmitted associated with a receive line and (opposite) transmit signals [+1 −1 −1 −1] of a corresponding second matrix of the second block 21B are transmitted associated with a corresponding receive line at the same time interval. It is noted that, as any transmit signal in one block at any given time has a phase opposite to a corresponding transmit signal in another block in the present embodiment, electromagnetic interference (EMI) can be substantially reduced compared to the cascade touch control system 200A of FIG. 3A/3B.

Figure 5B:
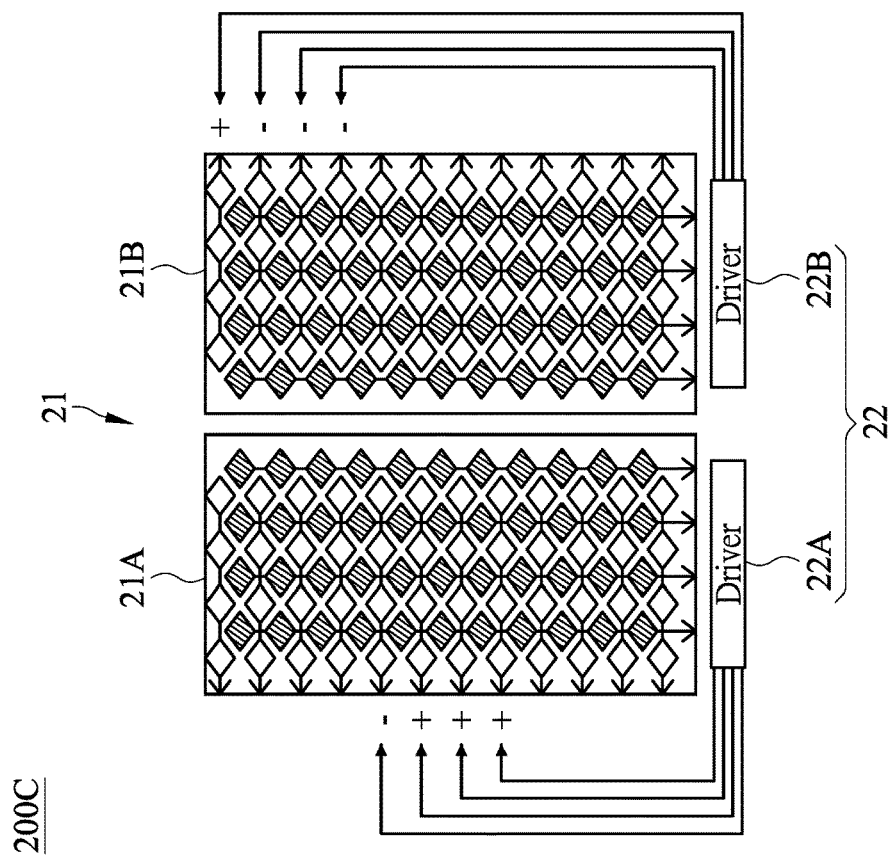
FIG. 5A and FIG. 5B show simplified schematic diagrams illustrating a cascade touch control system according to another embodiment of the present invention.
Figure 5A:
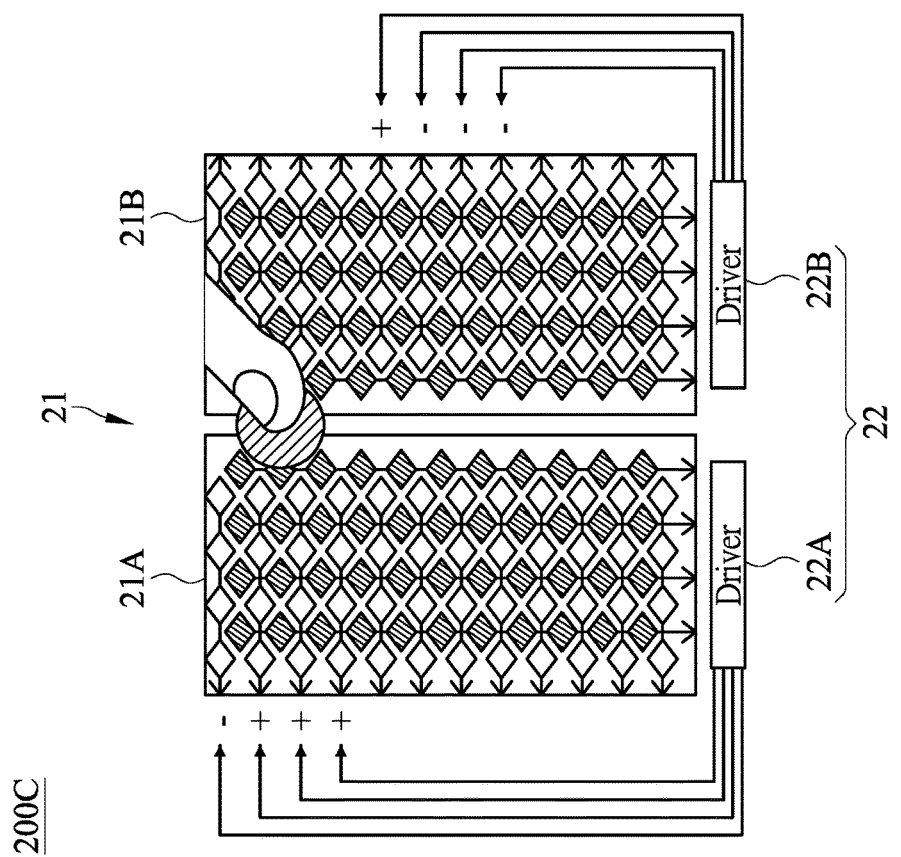

FIG. 5A and FIG. 5B show simplified schematic diagrams illustrating a cascade touch control system 200C according to another embodiment of the present invention. Multi-tone touch control of the cascade touch control system 200C of FIG. 5A/5B is similar to the cascade touch control system 200B of FIG. 4A/4B except that, in the present embodiment, different (or opposite) multi-tone touch controls are performed on corresponding neighbor matrices (of transmit lines and receive lines) of the multiple blocks of the touch panel 21 at the same time by associated drivers 22. Generally speaking, different (or opposite) multi-tone touch controls are performed on m-th matrix of one block and on (m±1)-th matrix of another block, respectively.

As exemplified in FIG. 5A, transmit signals [−1 +1 +1 +1] of a first matrix (generally m-th matrix, m is a positive integer) of the first block 21A are transmitted associated with a receive line and (opposite) transmit signals [+1 −1 −1 −1] of a corresponding neighbor second matrix (generally (m±1)-th matrix) of the second block 21B are transmitted associated with a corresponding receive line at the same time interval. Next, as exemplified in FIG. 5B, transmit signals [−1 +1 +1 +1] of a second matrix (generally (m±1)-th matrix) of the first block 21A are transmitted associated with a receive line and (opposite) transmit signals [+1 −1 −1 −1] of a corresponding neighbor first matrix (generally m-th matrix) of the second block 21B are transmitted associated with a corresponding receive line at the same time interval. It is noted that, as opposite multi-tone touch controls are performed on corresponding neighbor matrices (instead of the corresponding same matrices as in FIG. 4A/4B) of the multiple blocks of the touch panel 21 at the same time, erroneous detecting of touching at the junction of two blocks 21A and 21B may be prevented.

In an alternative embodiment, corresponding neighbor matrices of the blocks 21A and 21B are separated by at least one matrix. Generally speaking, different (or opposite) multi-tone touch controls are performed on m-th matrix of one block and on (m±p)-th matrix (p is a positive integer greater than one) of another block, respectively.

Figure 6:
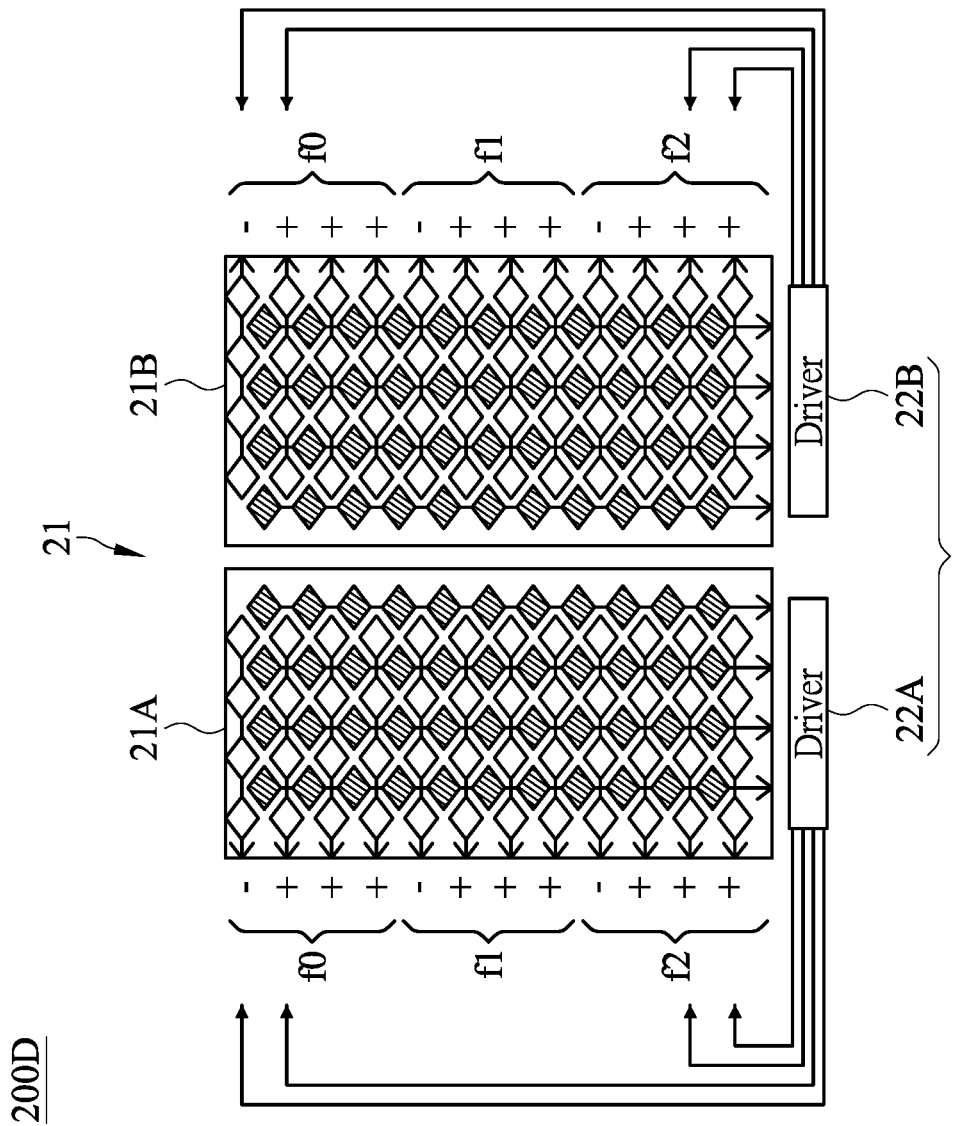
FIG. 6 shows a simplified schematic diagram illustrating a cascade touch control system according to a further embodiment of the present invention.

FIG. 6 shows a simplified schematic diagram illustrating a cascade touch control system 200D according to a further embodiment of the present invention. Multi-tone touch control of the cascade touch control system 200D of FIG. 6 is similar to the cascade touch control system 200B of FIG. 4A/4B except for the following aspects. In the present embodiment, in addition to performing different (opposite) multi-tone touch control on corresponding same matrices of the multiple blocks of the touch panel 21 at the same time by associated drivers 22 as in FIG. 4A/4B, transmit signals of different matrices of the same block are transmitted with different frequencies (e.g., f0, f1 and f2 as exemplified in FIG. 6), but transmit signals of corresponding same matrices of the blocks 21A and 21B are transmitted with the same frequency.

Figure 7:
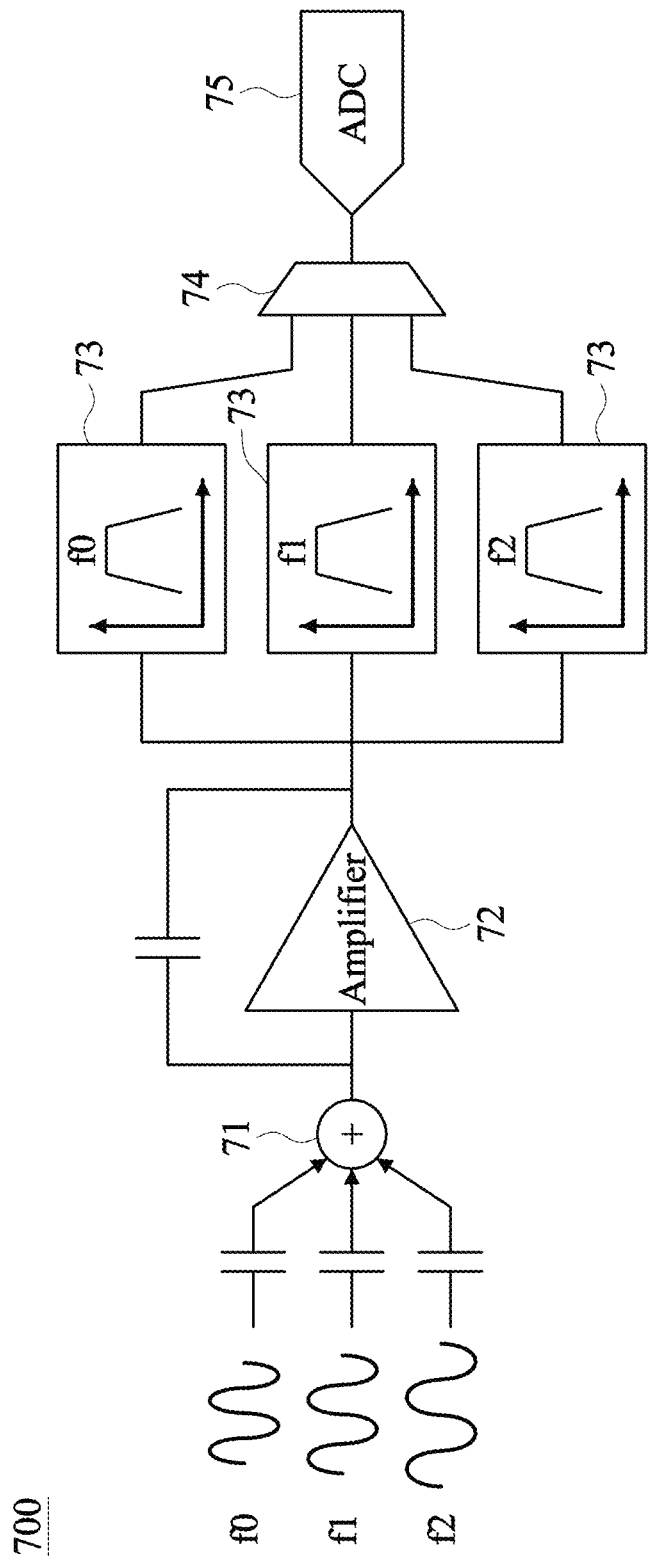
FIG. 7 shows a block diagram illustrating a circuit adaptable to processing the receive signals of the cascade touch control system of FIG. 6.

FIG. 7 shows a block diagram illustrating a circuit 700 adaptable to processing the receive signals of the cascade touch control system 200D of FIG. 6. Specifically, the circuit 700 may include an adder 71 coupled to receive the receive signals to generate a composite signal, which is then fed to an analog front-end (AFE) circuit, for example, composed of an amplifier 72. The amplified signal is fed to multiple (narrow) band-pass filters 73 configured to pass amplified signals with respective frequencies. The filtered signals are selected by a multiplexer 74 and the selected signal is then converted into a digital signal by an analog-to-digital converter (ADC) 75.

Figure 8:
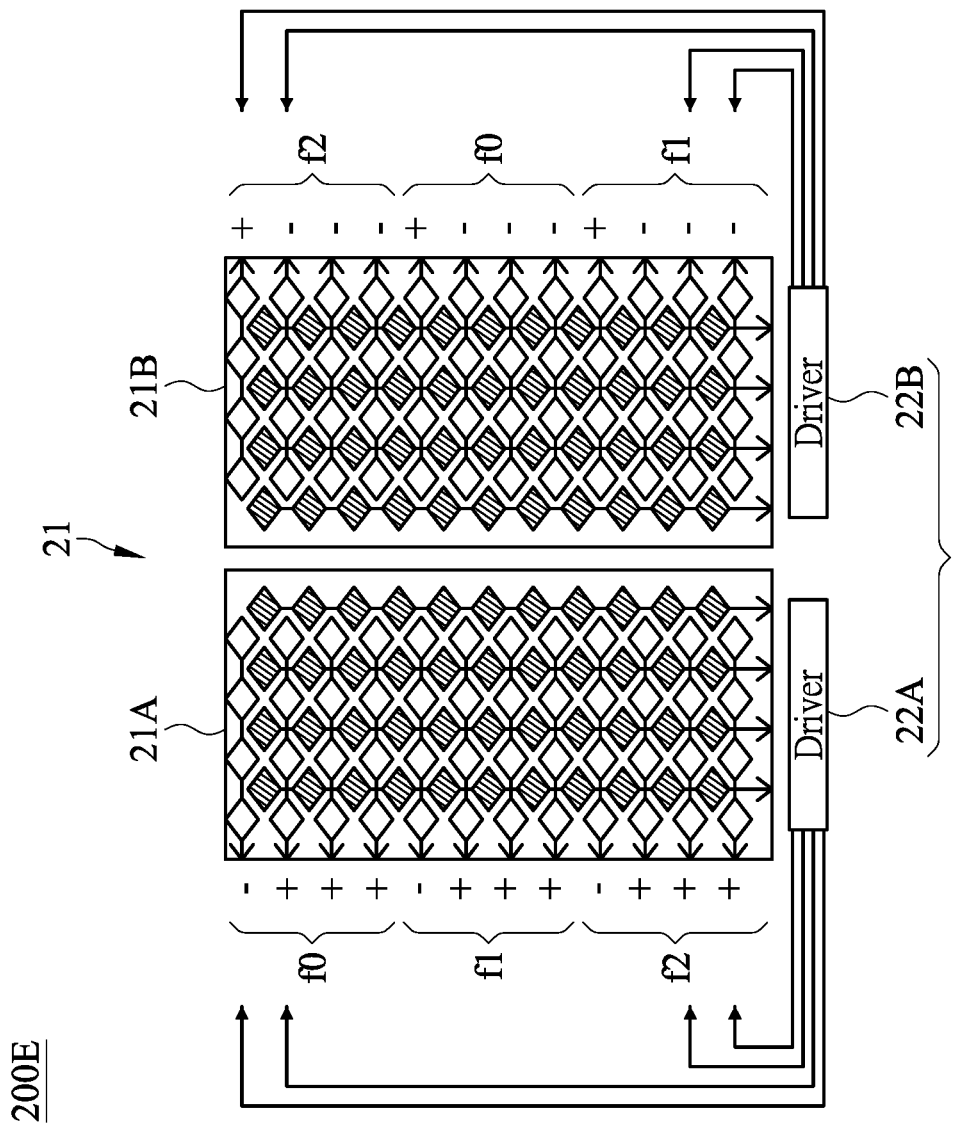
FIG. 8 shows a simplified schematic diagram illustrating a cascade touch control system according to a further embodiment of the present invention.

FIG. 8 shows a simplified schematic diagram illustrating a cascade touch control system 200E according to a further embodiment of the present invention. Multi-tone touch control of the cascade touch control system 200E of FIG. 8 is similar to the cascade touch control system 200D of FIG. 6 except for the following aspects. In the present embodiment, in addition to performing different (opposite) multi-tone touch control on corresponding same matrices of the multiple blocks of the touch panel 21 at the same time by associated drivers 22 as in FIG. 6, transmit signals of corresponding neighbor matrices of the blocks 21A and 21B are transmitted with the same frequency. Generally speaking, transmit signals of m-th matrix of one block and (m±1)-th matrix of another block are transmitted with the same frequency.

Figure 9:
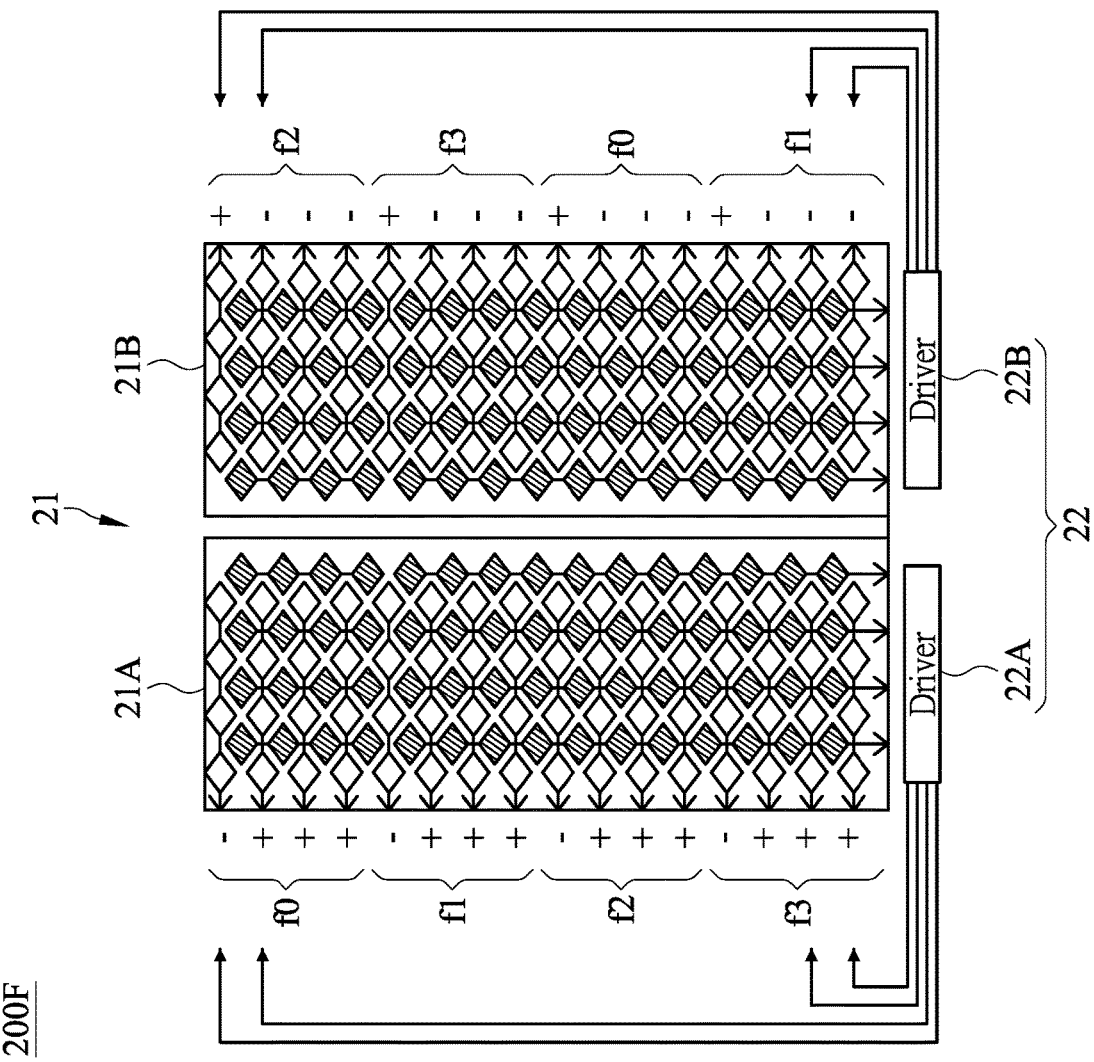
FIG. 9 shows a simplified schematic diagram illustrating a cascade touch control system according to a further embodiment of the present invention.

FIG. 9 shows a simplified schematic diagram illustrating a cascade touch control system 200F according to a further embodiment of the present invention. Multi-tone touch control of the cascade touch control system 200F of FIG. 9 is similar to the cascade touch control system 200E of FIG. 8 except that corresponding neighbor matrices of the blocks 21A and 21B are separated by at least one matrix. As exemplified in FIG. 9, the first matrix (generally m-th matrix) of the block 21A and the third matrix (generally (m±p)-th matrix, p is a positive integer greater than one) of the block 21B are separated by one matrix, and transmit signals of these matrices are transmitted with the same frequency f0. Generally speaking, transmit signals of m-th matrix of one block and (m±p)-th matrix (p is a positive integer greater than one) of another block are transmitted with the same frequency. Accordingly, erroneous detecting of touching at the junction of four matrices (e.g., the first and second matrices of the first block 21A and the first and second matrices of the second block 21B) as in FIG. 8 may be prevented.

Although specific embodiments have been illustrated and described, it will be appreciated by those skilled in the art that various modifications may be made without departing from the scope of the present invention, which is intended to be limited solely by the appended claims.

What is claimed is:

1. A cascade touch control system, comprising:
a touch panel composed of a plurality of transmit lines and a plurality of receive lines; and
a plurality of drivers controlling corresponding blocks of the touch panel, each block being divided into matrices each including same number of transmit lines and receive lines;
wherein multi-tone touch control is performed on matrices of the blocks;
wherein, for each matrix of each block, transmit signals are transmitted in each time interval associated with a corresponding receive line, of which one transmit signal has a phase opposite to other transmit signals, and different transmit signals with the opposite phase correspond to different time intervals.

2. The system of claim 1, wherein opposite multi-tone touch controls are performed on corresponding same matrices of the blocks of the touch panel at a same time by associated drivers.

3. The system of claim 2, wherein transmit signals of different matrices of same block are transmitted with different frequencies, but transmit signals of corresponding same matrices of the blocks are transmitted with same frequency.

4. The system of claim 1, wherein any transmit signal in one block at any given time has a phase opposite to a corresponding transmit signal in another block.

5. The system of claim 1, wherein opposite multi-tone touch controls are performed on m-th matrix of one block and on (m±1)-th matrix of another block respectively, wherein m is a positive integer.

6. The system of claim 5, wherein transmit signals of different matrices of same block are transmitted with different frequencies, but transmit signals of m-th matrix of one block and (m±1)-th matrix of another block are transmitted with same frequency.

7. The system of claim 1, wherein opposite multi-tone touch controls are performed on m-th matrix of one block and on (m±p)-th matrix of another block respectively, wherein m is a positive integer and p is a positive integer greater than one.

8. The system of claim 7, wherein transmit signals of different matrices of same block are transmitted with different frequencies, but transmit signals of m-th matrix of one block and (m±p)-th matrix of another block are transmitted with same frequency.

9. The system of claim 1, wherein each driver comprises:
a transmitter configured to transmit at least one transmit signal to corresponding transmit line; and
a receiver configured to receive at least one receive signal from corresponding receive line.

10. The system of claim 1, further comprising:
capacitors respectively located at intersections of the transmit lines and the receive lines for detecting touching.

11. The system of claim 1, further comprising:
an adder configured to add receive signals with different frequencies to generate a composite signal;
a plurality of band-pass filters configured to pass the receive signals with respective frequencies, thereby generating filtered signals;
a multiplexer that selects one of the filtered signals to generate a selected signal; and
an analog-to-digital converter that converts the selected signal into a digital signal.

12. The system of claim 11, further comprising:
an amplifier that amplifies the composite signal to generate an amplified signal, which is then fed to the plurality of band-pass filters.

* * * * *